April 25, 1939.                    D. F. BRUCE                    2,155,640
                                  HOSE COUPLING
                                Filed July 11, 1938
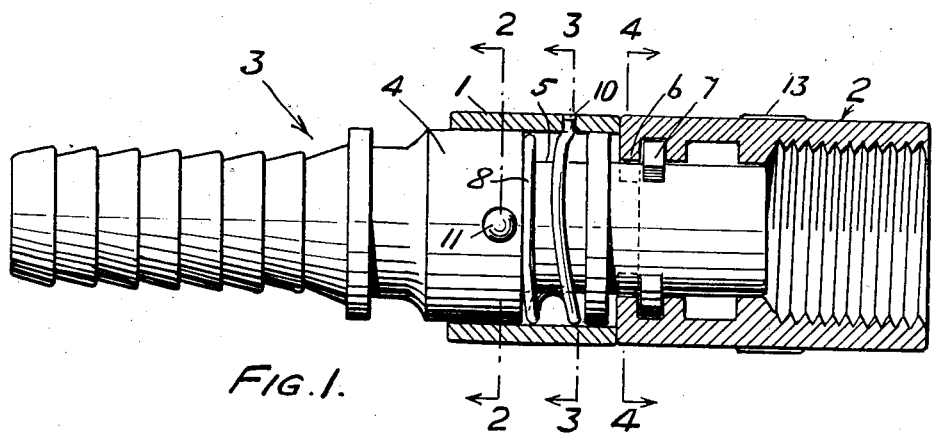
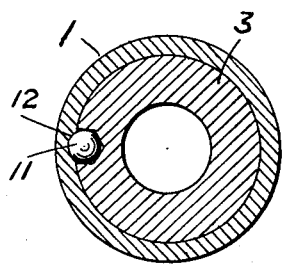
FIG. 2.
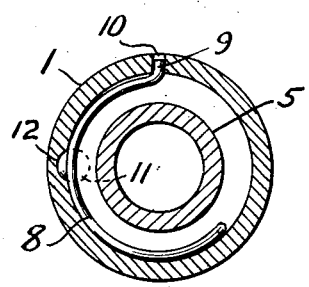
FIG. 3.
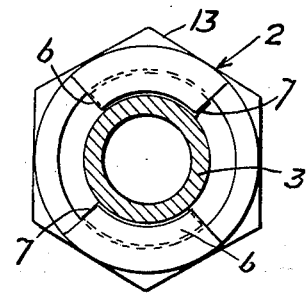
FIG. 4.
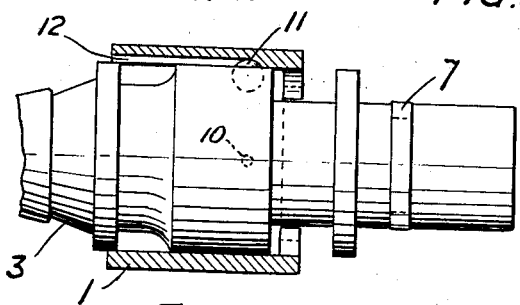
FIG. 5.
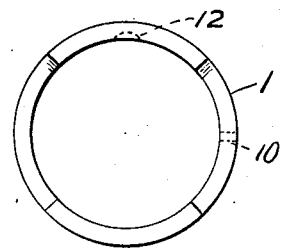
FIG. 6.
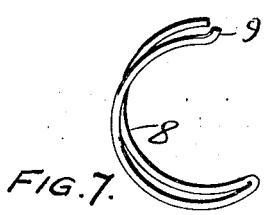
FIG. 7.
WITNESS:
Rob⁺ R. Kitchel
INVENTOR
David F. Bruce
BY
Augustus B. Stoughton
ATTORNEY.

Patented Apr. 25, 1939

2,155,640

UNITED STATES PATENT OFFICE 2,155,640

HOSE COUPLING

David F. Bruce, Philadelphia, Pa., assignor to Algonquin Coupling Company, Philadelphia, Pa., a corporation of Pennsylvania Application July 11, 1938, Serial No. 218,506

2 Claims. (Cl. 285—175)

The present invention relates to improvements in hose couplings of the type having a bayonet joint connection between its elements or members and having a spring pressed sleeve clamp for the joint.

Objects of the present invention are to reduce the length of the coupling; to permit of repairs to the coupling; to avoid jamming of the parts of the coupling; to enable one of the coupling elements to be provided with a male or female end or an end of any desired shape for the attachment of a hose; and to facilitate the construction and assembly of the parts.

Other objects of the invention will appear from the following description at the end of which the invention will be claimed.

To these and other ends hereinafter set forth the invention consists of a looped bow spring of arcuate form adapted to be assembled and disassembled sidewise of the coupling and tending to shift the sleeve clasp into clasping position and having the end of one leg outturned to enter a hole through the wall of the sleeve clasp and having the other leg in abutment with the wall of a groove provided in one of the coupling elements and a ball and its complemental axial groove of limited length interposed between the clamp sleeve and said coupling member and adapted to oppose rotation and permit axial movement of the sleeve clamp.

The invention also comprises the improvements to be presently described and finally claimed.

In the following description reference will be made to the accompanying drawing forming part hereof and in which, Figure 1 is an elevational view partly in central cross section of a coupling embodying features of the invention.

Figs. 2, 3 and 4 are sectional views taken respectively on the lines 2—2, 3—3 and 4—4 of Figure 1 looking in the direction of the arrows.

Figure 5 is a sectional view of parts of the device taken at right angles to the section of Figure 1.

Figure 6 is an end view of the sleeve clamp shown in Figure 5, and

Figure 7 is a perspective view of the looped arcuate bow spring.

Referring to the drawing, 1 indicates the sleeve clasp of a hose coupling comprising a female element 2 and a male element 3 having a cylindrical shank 4 provided with a circumferential groove 5. The elements 2 and 3 have arranged between them the members 6 and 7 of a bayonet joint. 8 indicates a looped bow spring of arcuate form and it is arranged in the groove 5 and the end 9 of one leg is outturned to enter a hole 10 through the wall of the clasp sleeve. The other leg of the spring is in abutment on the wall of the groove 5. The tendency of the spring is to shaft the clamp sleeve into clamping position and in that position projections on the clamp sleeve enter recesses in the element 2 and in that way prevent rotation of the parts and uncoupling of the bayonet joint. 11 is a ball and 12, Figure 5, is its complemental groove of limited length. The ball and the groove are interposed between the inner face of the clasp sleeve 1 and the outer face of the cylindrical shank 4. The purpose of the ball and groove is to oppose rotation and permit limited endwise movement of the sleeve clasp under the action of the spring 8. 13 indicates a squared or polygonal flange intended for the application of a wrench. To assemble the parts the element 2 is uncoupled and the ball 11 is mounted in the pit provided for it in the shank 4. The clamping sleeve 1 is then slipped over the shank 4 from right to left in the drawing with the groove 12 in line with the ball 11. The bow spring 8 is then put into the groove 5 sidewise of the coupling and is adjusted so that its end 9 takes into the hole 10. From this description it is evident that the left hand end of the member 3 may be finished as a male or female coupling or in any form desirable for a hose connection. Whenever it is desired to make repairs the end 9 of the spring may be pushed inward out of the hole 10 and then the clamp sleeve 1 can be removed and all the parts disassembled for such repairs as may be necessary. The fact that the length of the groove 12 is limited permits its right hand end in Figure 5 to cooperate with the ball 11 as a stop for limiting the motion of the clamp sleeve 1 toward the left. The motion of the clamp sleeve 1 toward the right is limited by the outturned end of the spring and the right-hand wall of the groove 5 Figure 1.

It will be obvious to those skilled in the art to which the invention relates that modifications may be made in details of construction and arrangement and in matters of mere form hence the invention is not limited otherwise than the prior art and the appended claims may require.

I claim:

1. For the clasp sleeve of a hose coupling comprising a female element and a male element having a cylindrical shank provided with a circumferential groove, said elements having between them the members of a bayonet joint, the combination of a looped bow spring of arcuate form arranged in said groove and having the end of one leg outturned to enter a hole through the wall of the clasp sleeve and having the other leg in abutment with one wall of the groove and tending to shift the clasp sleeve into clasping position, the outturned end of the spring providing a sleeve stop in the other direction, and a ball and its pit complemental axial groove of limited length interposed between the inner face of the clasp sleeve and the outer face of the cylindrical shank and adapted to oppose rotation and permit limited endwise movement of the clasp sleeve under the action of said spring, said looped bow spring arcuate in form and adapted for assembly and disassembly sidewise of the coupling.

2. For the clasp sleeve of a hose coupling comprising a female element and a male element having a cylindrical shank provided with a circumferential groove, said elements having between them the members of a bayonet joint, the combination of a looped bow spring of arcuate form arranged in said groove and having the end of one leg outturned to enter a hole through the wall of the clasp sleeve and having the other leg in abutment with one wall of the groove and tending to shift the clasp sleeve into clasping position, said outturned end of the spring providing a sleeve stop in the other direction, and a ball and its complemental axial groove and pit interposed between the inner face of the clasp sleeve and the outer face of the cylindrical shank and adapted to oppose rotation and permit limited endwise movement of the clasp sleeve under the action of said spring, said looped bow spring arcuate in form and adapted for assembly and disassembly sidewise of the coupling.

DAVID F. BRUCE.